(12) United States Patent
Yurjevich et al.

(10) Patent No.: US 10,336,141 B2
(45) Date of Patent: Jul. 2, 2019

(54) TIRE HAVING STATIC CHARGE DISSIPATION ELEMENT

(71) Applicant: Bridgestone Americas Tire Operations, LLC, Nashville, TN (US)

(72) Inventors: Martin A. Yurjevich, North Canton, OH (US); Adam K. Nesbitt, Akron, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 0 days.

(21) Appl. No.: 15/104,603

(22) PCT Filed: Dec. 10, 2014

(86) PCT No.: PCT/US2014/069428
§ 371 (c)(1),
(2) Date: Jun. 15, 2016

(87) PCT Pub. No.: WO2015/094831
PCT Pub. Date: Jun. 25, 2015

(65) Prior Publication Data
US 2016/0311271 A1    Oct. 27, 2016

(51) Int. Cl.
*B60C 19/08* (2006.01)
(52) U.S. Cl.
CPC .................. *B60C 19/082* (2013.01)
(58) Field of Classification Search
CPC ... B60C 19/08; B60C 19/082; B60C 11/0008; B60C 2011/0091; B29D 2030/526
USPC ....................................................... 152/152.1
See application file for complete search history.

(56) References Cited

U.S. PATENT DOCUMENTS

| | | | |
|---|---|---|---|
| 3,158,782 A | 11/1964 | Maratuech et al. | |
| 5,942,069 A | 8/1999 | Gerresheim et al. | |
| 6,220,319 B1 | 4/2001 | Reuter | |
| 6,367,525 B1 | 4/2002 | Hiruma et al. | |
| 7,029,544 B2 | 4/2006 | Lanzarotta et al. | |
| 7,350,550 B2 | 4/2008 | Dheur et al. | |
| 7,610,873 B2 | 11/2009 | Campbell | |
| 2002/0185210 A1 | 12/2002 | Poulbot | |
| 2003/0089436 A1* | 5/2003 | Lanzarotta | B60C 19/08 152/152.1 |
| 2006/0096697 A1 | 5/2006 | Miki | |
| 2007/0125466 A1 | 6/2007 | Nagahara | |
| 2008/0142130 A1 | 6/2008 | Kiwaki | |
| 2010/0258227 A1 | 10/2010 | Kuroki | |
| 2011/0308675 A1 | 12/2011 | Hinc et al. | |
| 2012/0048434 A1 | 3/2012 | Kuroki | |

(Continued)

FOREIGN PATENT DOCUMENTS

| DE | 10 2007 039100 | * 2/2009 | ............. B60C 19/08 |
|---|---|---|---|
| DE | 10 2013 103911 | * 10/2014 | ............. B60C 19/08 |

(Continued)

OTHER PUBLICATIONS

DE 10 2013 103911, Oct. 2014, English language machine translation [www.epo.org].*

(Continued)

*Primary Examiner* — Eric Hug

(57) ABSTRACT

Various embodiments of a tire and tire tread having a static charge dissipation element are provided.

13 Claims, 10 Drawing Sheets

(56) References Cited

U.S. PATENT DOCUMENTS

| | | |
|---|---|---|
| 2013/0025752 A1 | 1/2013 | Aoki et al. |
| 2013/0025753 A1 | 1/2013 | Nagai |
| 2013/0068358 A1 | 3/2013 | Shinkai |
| 2013/0092300 A1 | 4/2013 | Kunisawa et al. |

FOREIGN PATENT DOCUMENTS

| | | | | |
|---|---|---|---|---|
| DE | 102013103911 A1 | | 10/2014 | |
| EP | 2125351 B1 | | 12/2009 | |
| EP | 2520421 A1 | | 11/2012 | |
| FR | 2759946 | * | 8/1998 | ............. B60C 19/08 |
| JP | H10-081106 A | | 3/1998 | |
| JP | 2000-313072 A | | 11/2000 | |
| JP | 2005-47445 | * | 2/2005 | |
| JP | 2005-47445 A | | 2/2005 | |
| JP | 2005-212738 | * | 8/2005 | |
| JP | 2005-212738 A | | 8/2005 | |
| JP | 2012-143993 A | | 8/2012 | |
| JP | 2013095323 A | | 5/2013 | |
| JP | 2013-116606 A | | 6/2013 | |
| KR | 20000020302 A | | 4/2000 | |
| KR | 10-2009-0070349 A | | 12/2002 | |
| WO | 0222382 A1 | | 3/2002 | |

OTHER PUBLICATIONS

JP 2005-47445, Feb. 2005, English language machine translation [www.epo.org].*
Commissioner; International Search Report and Written Opinion for PCT patent application PCT/US2014/069428; dated Dec. 20, 2015; pp. 1-47; Korean Intellectual Property Office; Daejeon Metropolitan City, Republic of Korea.
English machine translation of JP2013095323A.
English machine translation of Abstract of JP2000-313072A.
English machine translation of Abstract of JP2012-143993A.
English machine translation of JPH10-081106A.
English machine translation of Abstract of DE102013103911A1.
Supplementary European search report issued with extended European search report dated Jun. 21, 2017 in European Pat. App. No. 14872657.3.
English machine translation of Abstract of JP2005-47445A.
English machine translation of Abstract of KR10-2009-0070349A.
English machine translation of Abstract of JP2013-116606A.
English machine translation of Abstract of JP2005-212738A.

* cited by examiner

TIRE HAVING STATIC CHARGE DISSIPATION ELEMENT

BACKGROUND

Tires mounted on a vehicle often generate static electricity as a result of internal friction during running of the tire. This friction may be a result of deformation of the rubber tire. Tires mounted on a vehicle often include tread compounds utilizing silica, resulting in a tire tread comprising a higher electrical resistance. As a result of higher electrical resistance, tires may not readily discharge built up electricity, which may result in interference with a vehicle's electronic devices, dangerous sparking near combustible materials, or unpleasant discharge to one operating the vehicle.

Many tires include conductive materials oriented about the circumference of the tire's tread to permit discharge of built up electricity into the ground. However, such conductive materials often require undesirable or costly modification of a tire tread or tire manufacturing process.

What is needed is a tire having a conductive element easily added to the tire tread with minimal modification.

SUMMARY

In one embodiment, a tire tread is provided, the tire tread comprising: a road-contacting surface; an inner component-contacting surface; a splice surface comprising a radially outer edge and a radially inner edge; at least one conductive element; wherein the at least one conductive element extends from the splice surface to or past the radially outer edge; wherein the at least one conductive element extends from the splice surface to or past the radially inner edge; wherein each of the at least one conductive element is oriented in contact with the splice surface; and wherein each of the at least one conductive element is oriented substantially parallel to the splice surface.

In one embodiment, a tire is provided, the tire comprising: an inner component; and a tire tread, comprising: a road-contacting surface; an inner component-contacting surface; a splice surface comprising a radially outer edge and a radially inner edge; at least one conductive element; wherein the at least one conductive element extends from the splice surface to or past the radially outer edge; wherein the at least one conductive element extends from the splice surface to or past the radially inner edge and contacts the inner component; wherein each of the at least one conductive element is oriented in contact with the splice surface; and wherein each of the at least one conductive element is oriented substantially parallel to the splice surface.

In another embodiment, a tire is provided, the tire comprising: an inner component; and a tire tread, comprising: a pattern comprising at least one of at least one tread rib or at least one tread block, wherein at least one of the at least one tread rib and the at least one tread block comprises a radially outermost portion; and an inner component-contacting surface; a splice surface comprising a radially outer edge and a radially inner edge; at least one conductive element; wherein the at least one conductive element extends from the splice surface to or past the radially outermost portion; wherein the at least one conductive element extends from the splice surface to or past the radially inner edge and contacts the inner component; wherein each of the at least one conductive element is oriented in contact with the splice surface; and wherein each of the at least one conductive element is oriented substantially parallel to the splice surface.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1:
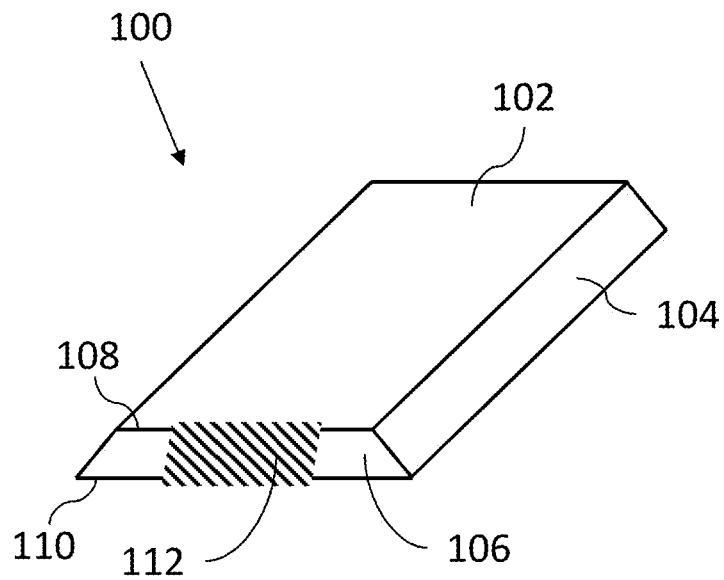
FIG. 1 illustrates a perspective view of an example embodiment of a tire tread having a conductive element.

Tire tread comprising a nonconductive material, such as silica, typically comprises a higher electrical resistance than other rubber elements in a tire. For example, inner tire components may comprise carbon black in a quantity adequate to lower the electrical resistance of the inner tire components, thus allowing the inner tire components to sufficiently conduct electricity. In one embodiment, inner tire components comprise at least one of an undertread, a subtread, a tire carcass, a tire belt, a tire reinforcing ply, and the like.

Generally, nonconductive materials are those comprising an electrical resistivity that prevents discharge of built up electricity in a vehicle at a rate sufficient to avoid negative effects of electricity build up in the vehicle. In one embodiment, nonconductive materials are materials comprising an electrical resistivity of about $10^{11}$ $\Omega \cdot cm$ or greater. In another embodiment, nonconductive materials are materials comprising an electrical resistivity of about $10^9$ $\Omega \cdot cm$ or greater. In another embodiment, nonconductive materials are materials comprising an electrical resistivity of about $10^8$ Ω·cm or greater.

Generally, conductive materials are those comprising an electrical resistivity that permits discharge of built up electricity in a vehicle at a rate sufficient to avoid negative effects of electricity build up in the vehicle. In one embodiment, conductive materials are materials comprising an electrical resistivity of about $10^9$ Ω·cm or less. In another embodiment, conductive materials are materials comprising an electrical resistivity of about $10^8$ Ω·cm or less. In another embodiment, conductive materials are materials comprising an electrical resistivity of about $10^6$ Ω·cm or less. In another embodiment, conductive materials are materials comprising an electrical resistivity of between about $10^5$ Ω·cm and about $10^9$ Ω·cm. In another embodiment, conductive materials are materials comprising an electrical resistivity of between about $10^5$ Ω·cm and about $10^8$ Ω·cm. In another embodiment, conductive materials are materials comprising an electrical resistivity of between about $10^5$ Ω·cm and about $10^6$ Ω·cm.

In one embodiment, electrical resistivity of conductive and nonconductive materials is determined using a volume resistivity test. In another embodiment, electrical resistivity of conductive and nonconductive materials is determined using an ASTM D991 test.

In another embodiment, electrical resistivity of conductive and nonconductive materials may be determined using a test including a probe, a test fixture, a resistance/current meter, a thermo-hygrometer, and a thickness gauge capable of reading to 0.001 inches. A test sample of a conductive or nonconductive material may have dimensions of about 6.0 inches by 6.0 inches, by 0.1 inch. The test sample's thickness may be measured to the nearest 0.001 inch in two places, which may be about 2.0 inches from the test sample's edge, along a line bisecting the test sample. The test sample's edges referenced in the measurement of thickness may be adjacent to one another and approximately 90 degrees to one another. The test sample is laid on a table for at least 1.0 hour at room temperature prior to taking resistivity measurements. The test sample may be oriented in the test apparatus such that the test sample's edge is aligned with the edge of a conductive plate, which conductive plate is connected via a probe to the resistance meter, all of which is below the test sample. The remaining three sides of the test sample may hang over the edges of the conductive plate evenly. A second probe may be connected to an input of the resistance meter, and may be placed on the top of the test sample, such that it is approximately on center with the conductive plate oriented beneath the test sample. Following placement of the test sample and probes in the test fixture, electrical resistivity may be measured via the resistance meter. In one embodiment, the probe and test fixture are verified prior to testing a test sample's resistivity.

FIG. 1 illustrates an example embodiment of a tire tread 100. Tire tread 100 comprises a road-contacting surface 102, an inner component-contacting surface (not shown), at least one side surface 104, and a splice surface 106. Splice surface may comprise a radially outer edge 108 and a radially inner edge 110. In one embodiment, tire tread 100 comprises at least one conductive element 112.

Tire tread 100 may comprise any of a variety of materials commonly encountered in tire treads. Tire tread 100 may comprise any of a variety of deformable materials, including for example a rubber compound. In one embodiment, tire tread 100 comprises a tread compound. In another embodiment, tire tread 100 comprises a tread compound comprising a nonconductive material. In another embodiment, tire tread 100 comprises a tread compound comprising silica. In one embodiment, tire tread 100 comprises a substantially nonconductive material, including for example, silica.

In one embodiment, tire tread 100 is an extruded green tread, which has not yet been completely cured. In another embodiment, tire tread 100 is formed by any of a variety of methods, including for example extrusion, calendaring, and compression molding. In another embodiment, tire tread 100 is a cured tread.

Tire tread 100 comprises a ground-contacting surface 102, which will make up the radially outermost portion of a tire when tire tread 100 is applied to the tire inner components and subjected to curing. In one embodiment, a tire utilizing tire tread 100 comprises at least one tread rib and/or tread block, and at least one groove. In one embodiment, at least a portion of tire tread 100 will make up the radially outermost portion of a tread rib and/or tread block of a tire when tire tread 100 is applied to the tire inner components and subjected to curing.

In one embodiment, tire tread 100 comprises a green tread that has not yet been cured. Upon application to tire inner components, tire tread 100 is oriented about the outside circumference of the tire carcass and connected to itself at a splice. Splice surface 106 may interface with a second corresponding splice surface (not shown) when tire tread 100 is oriented about the outside circumference of the tire carcass.

In one embodiment, at least one conductive element 112 is oriented within the splice between splice surface 106 and a second corresponding splice surface (not shown). In one embodiment, conductive element 112 is any of a variety of conductive materials, including for example carbon black, a rubber comprising carbon black, a metallic element, or a rubber comprising a metallic element.

At least one conductive element 112 may comprise a thin sheet, layer, or strip of conductive material. In one embodiment, conductive element 112 comprises a thickness of about 0.500 mm. In another embodiment, conductive element 112 comprises a thickness of between about 0.400 mm and about 0.700 mm. In another embodiment, conductive element 112 comprises a thickness of between about 0.300 mm and about 0.900 mm. In another embodiment, conductive element 112 comprises a thickness of between about 0.200 mm and about 1.100 mm. The thickness of conductive element 112 is defined as its dimension in a circumferential direction of a tire.

In one embodiment, at least one conductive element 112 contacts splice surface 106. In another embodiment, each of at least one conductive element is oriented in contact with splice surface 106. In another embodiment, each of at least one conductive element is oriented substantially parallel to splice surface 106. In another embodiment, at least one conductive element 112 extends from splice surface 106, past radially outer edge 108. In another embodiment, at least one conductive element 112 extends from splice surface 106 past radially inner edge 110. In another embodiment, at least one conductive element 112 extends from splice surface 106 past radially outer edge 108 and past radially inner edge 110. In another embodiment, at least one conductive element 112 extends from splice surface 106 to radially outer edge 108. In another embodiment, at least one conductive element 112 extends from splice surface 106 to radially inner edge 110.

At least one conductive element 112 can comprise any of a variety of widths. In one embodiment, at least one conductive element 112 comprises a width less than the width of tire tread 100. In another embodiment, at least one conductive element 112 comprises a width substantially equal to the width of tire tread 100. The width of conductive element 112 is defined as its dimension in a transverse/axial direction of a tire.

At least one conductive element 112 can be oriented in any of a variety of positions across the width of tire tread 100. In one embodiment, at least one conductive element 112 is substantially centered across the width of tire tread 100. In another embodiment, at least one conductive element 112 is oriented closer to one side surface 104. In another embodiment, at least one conductive element 112 is oriented into close proximity with a first side surface 104, but not the second, opposite side surface 104.

In one embodiment, at least one conductive element 112 is oriented in a splice of tire tread 100 during or following application of tire tread 100 to the tire inner components. In practice, at least one conductive element 112 may be inserted in a splice such that at least a portion of it extends to or past radially inner edge 110 and contacts at least a portion of the tire inner components. At least one conductive element 112 may be inserted in a splice such that at least a portion of it extends to or past radially outer edge 108 and ends near at least a portion of road-contacting surface 102.

In one embodiment, a splice of tire tread 100 is substantially aligned with a tire axial direction. That is, the splice interface of the tire is along a line substantially parallel to the tire axial direction. As a result, splice surface 106 may be substantially parallel to the tire axial direction. In another embodiment, a splice of tire tread 100 is angled relative to a tire axial direction. As a result, splice surface 106 may be substantially angled relative to a tire axial direction. In one embodiment, conductive element 112 is oriented substantially parallel to splice surface 106.

In one embodiment, tire tread 100 is a cured tread comprising at least one conductive element 112. Conductive element 112 may be cured into a prepared end of tire tread 100, which will form part of a splice once applied to inner tire components. In one embodiment, tire tread 100 is used in a retreading process, wherein tire tread 100 comprises at least one conductive element 112 oriented at a splice surface 106. In practice, cured tire tread 100 comprising at least one conductive element 112 at a splice surface 106 is applied to inner tire components. Tire tread 100 is oriented about the radially outer portion of inner tire components. The remaining end of tire tread 100 is placed into contact with splice surface 106 and at least one conductive element 112.

Figure 2:
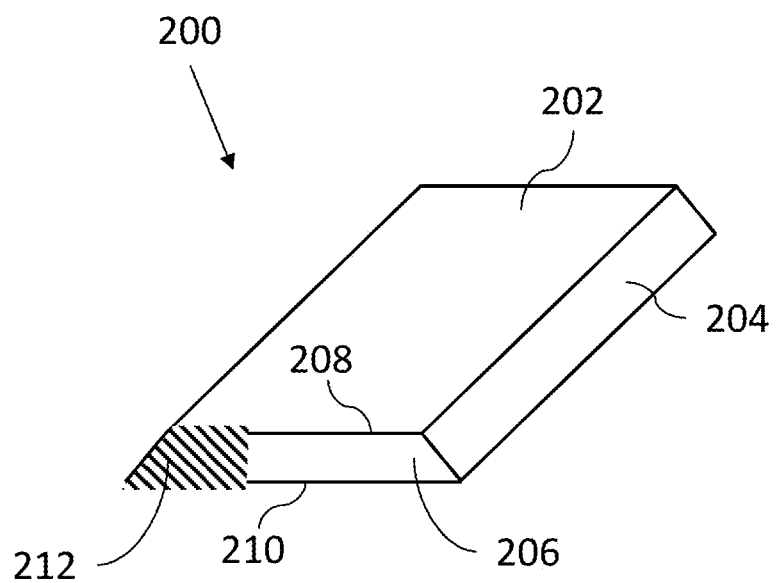
FIG. 2 illustrates a perspective view of an example embodiment of a tire tread having a conductive element.

FIG. 2 illustrates an example embodiment of a tire tread 200. Tire tread 200 comprises a road-contacting surface 202, an inner component-contacting surface (not shown), at least one side surface 204, and a splice surface 206. Splice surface may comprise a radially outer edge 208 and a radially inner edge 210. In one embodiment, tire tread 200 comprises at least one conductive element 212. At least one conductive element 212 may be oriented toward, or into contact with, at least one side surface 204.

Figure 3:
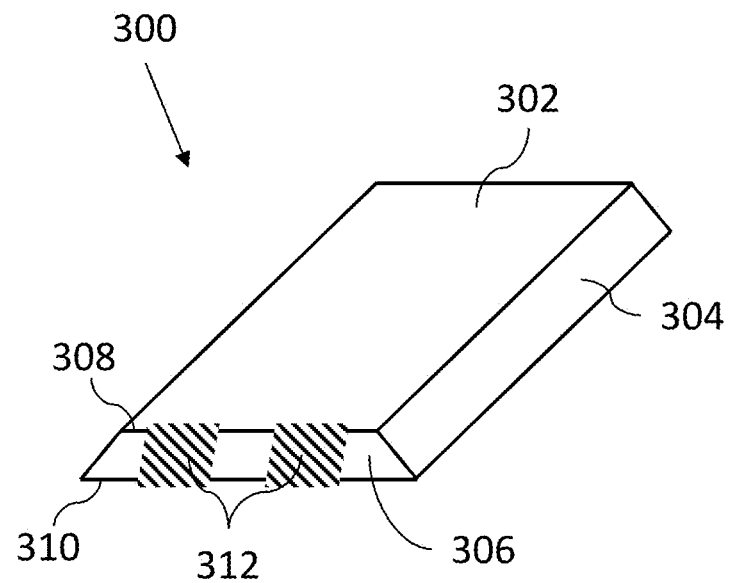
FIG. 3 illustrates a perspective view of an example embodiment of a tire tread having a conductive element.

FIG. 3 illustrates an example embodiment of a tire tread 300. Tire tread 300 comprises a road-contacting surface 302, an inner component-contacting surface (not shown), at least one side surface 304, and a splice surface 306. Splice surface may comprise a radially outer edge 308 and a radially inner edge 310. In one embodiment, tire tread 300 comprises at least one conductive element 312. At least one conductive element 312 may comprise a plurality of conductive elements oriented in any of a variety of positions across the width of tire tread 300. As illustrated, conductive elements 312 may be oriented on either side of the centerline of tire tread 300.

Figure 4:
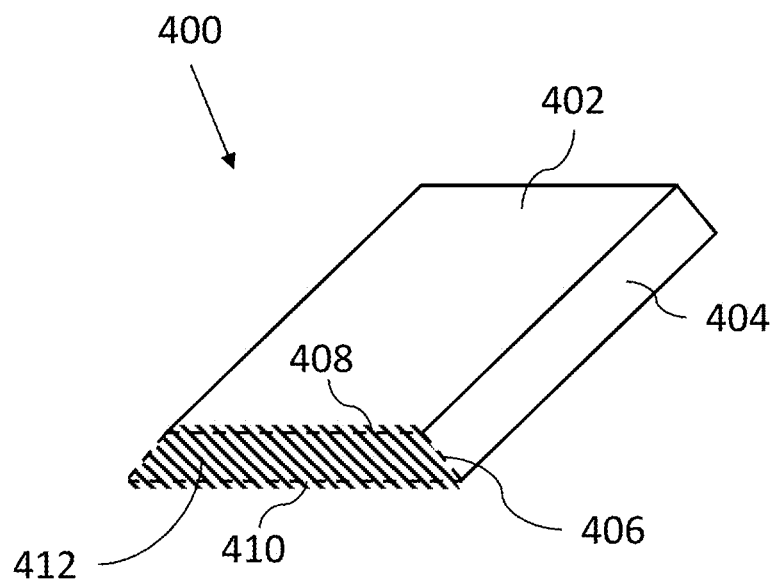
FIG. 4 illustrates a perspective view of an example embodiment of a tire tread having a conductive element.

FIG. 4 illustrates an example embodiment of a tire tread 400. Tire tread 400 comprises a road-contacting surface 402, an inner component-contacting surface (not shown), at least one side surface 404, and a splice surface 406. Splice surface may comprise a radially outer edge 408 and a radially inner edge 410. In one embodiment, tire tread 400 comprises at least one conductive element 412. At least one conductive element 412 may extend substantially across the entire width of tire tread 400. At least one conductive element 412 may substantially cover splice surface 406.

Figure 5:
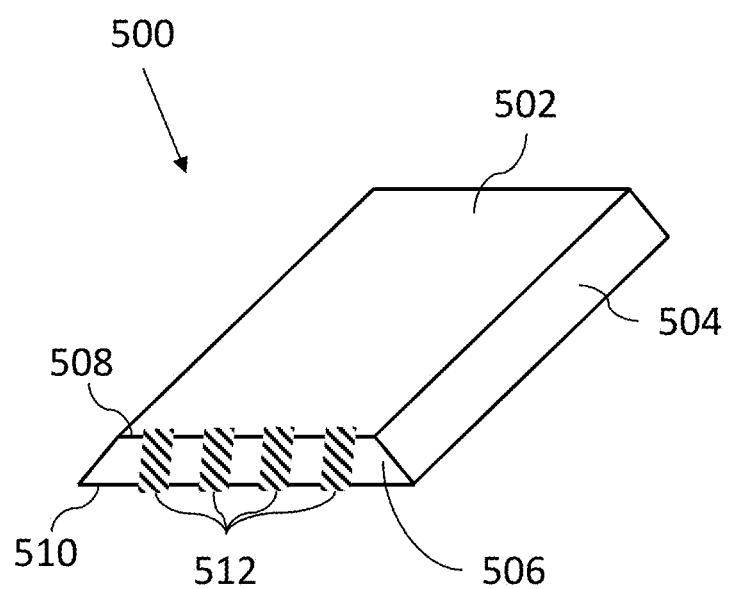
FIG. 5 illustrates a perspective view of an example embodiment of a tire tread having a conductive element.

FIG. 5 illustrates an example embodiment of a tire tread 500. Tire tread 500 comprises a road-contacting surface 502, an inner component-contacting surface (not shown), at least one side surface 504, and a splice surface 506. Splice surface may comprise a radially outer edge 508 and a radially inner edge 510. In one embodiment, tire tread 500 comprises at least one conductive element 512. At least one conductive element 512 may comprise a plurality of conductive elements oriented in any of a variety of positions across the width of tire tread 500. As illustrated, conductive elements 512 may be evenly spaced across the width of tire tread 500. In another embodiment, conductive elements 512 may be unevenly spaced across the width of tire tread 500.

Figure 6A:
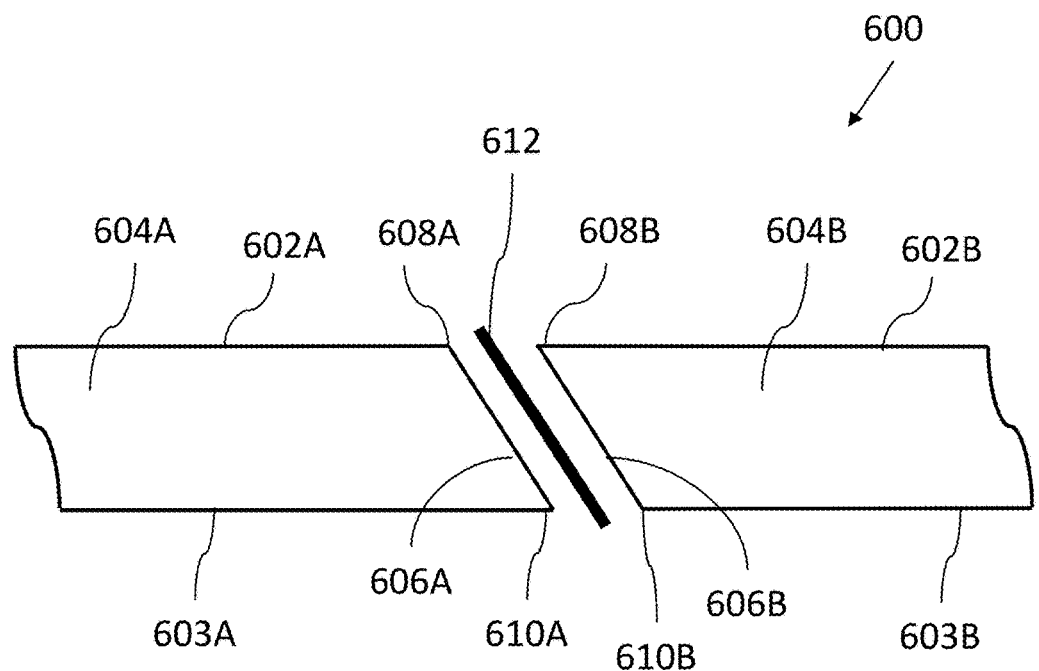
FIG. 6A illustrates a side exploded view of an example embodiment of a tire tread having a conductive element.

FIG. 6A illustrates an example embodiment of a tire tread 600 including a splice. Tire tread 600 comprises a first road-contacting surface 602A, a second road-contacting surface 602B, a first inner component-contacting surface 603A, a second inner component-contacting surface 603B, a first side surface 604A, a second side surface 604B, a first splice surface 606A, a second splice surface 606B, a first radially outer edge 608A, a second radially outer edge 608B, a first radially inner edge 610A, and a second radially inner edge 610B. Tire tread 600 may comprise at least one conductive element 612 oriented between first splice surface 606A and second splice surface 606B.

In one embodiment, at least one conductive element 612 extends above first radially outer edge 608A and second radially outer edge 608B. In another embodiment, at least one conductive element 612 extends below first radially inner edge 610A and second radially inner edge 610B. In another embodiment, at least one conductive element 612 extends to first radially outer edge 608A and second radially outer edge 608B. In another embodiment, at least one conductive element 612 extends to first radially inner edge 610A and second radially inner edge 610B.

In one embodiment, first splice surface 606A and second splice surface 606B may be oriented on an angle. In another embodiment, first splice surface 606A and second splice surface 606B may be oriented substantially orthogonally. In another embodiment, first splice surface 606A and second splice surface 606B may comprise substantially linear profiles. In another embodiment, first splice surface 606A and second splice surface 606B may comprise curved or otherwise irregular profiles.

Figure 6B:
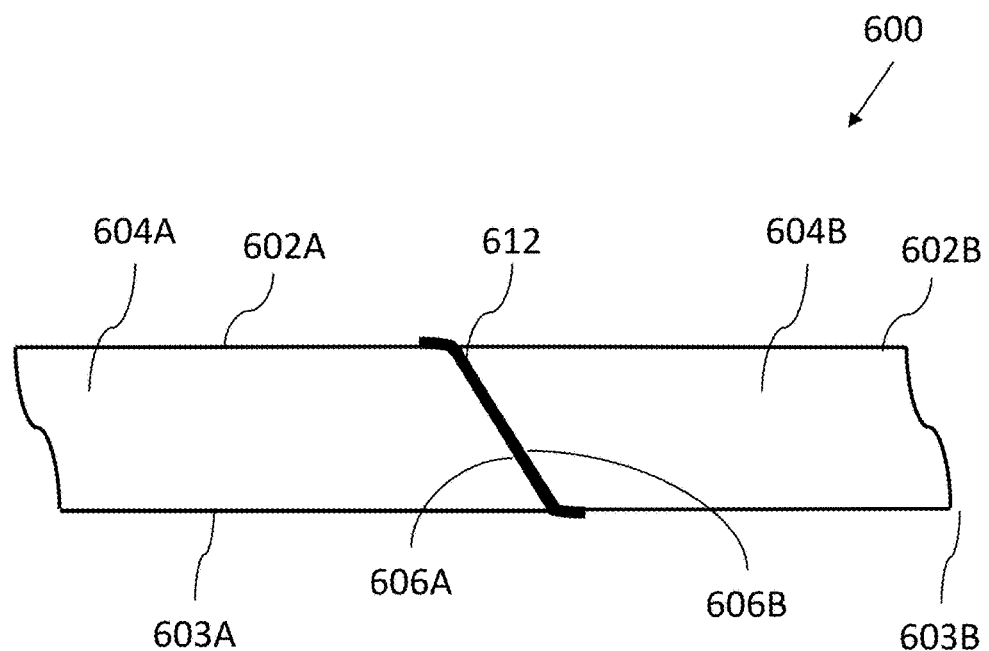
FIG. 6B illustrates a side view of an example embodiment of a tire tread having a conductive element.

FIG. 6B illustrates an example embodiment of tire tread 600, wherein first side surface 604A and second side surface 604B are brought together as they would be during the building of a tire, such that at least one conductive element 612 is oriented between first splice surface 606A and second splice surface 606B. As illustrated, at least one conductive element 612 may contact at least one of first road-contacting surface 602A, second road-contacting surface 602B, first inner component-contacting surface 603A, and second inner component-contacting surface 603B.

Figure 7:
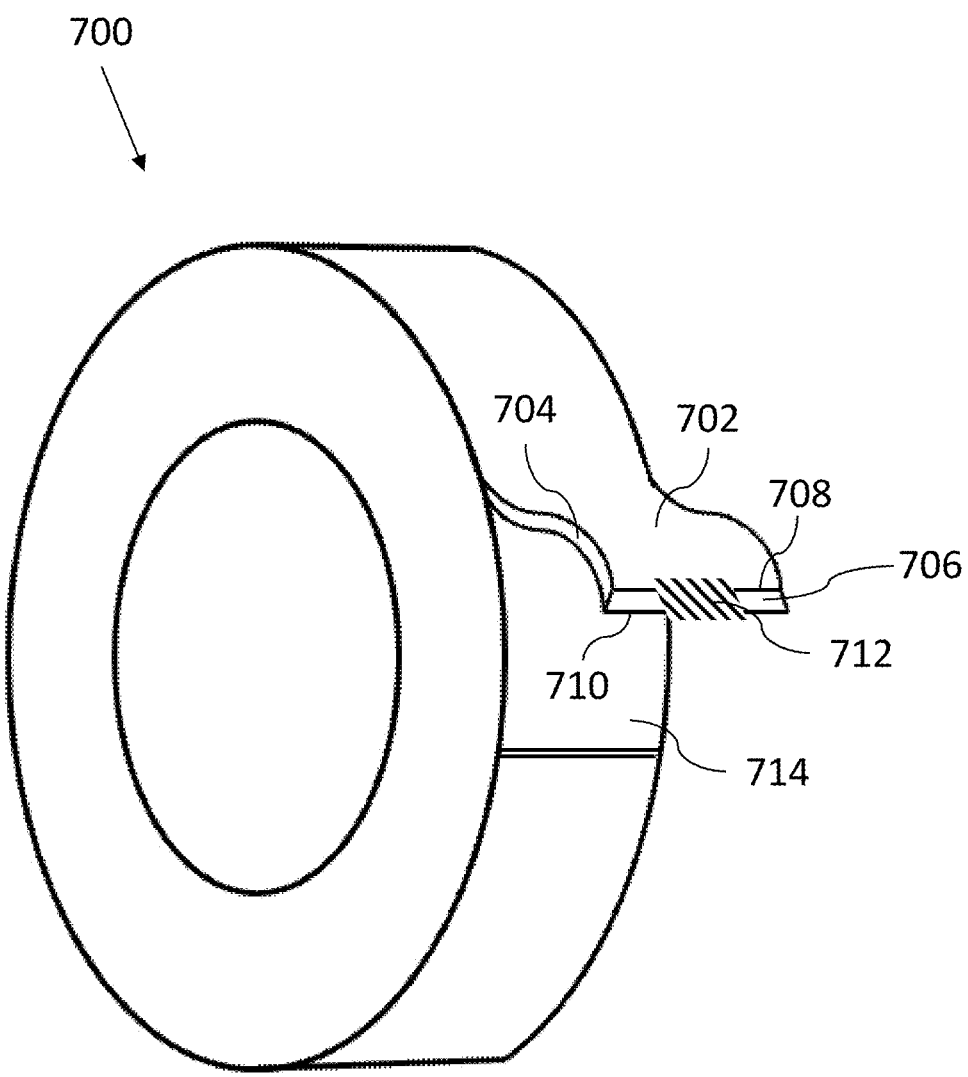
FIG. 7 illustrates a perspective view of an example embodiment of a tire with a tire tread having a conductive element.

FIG. 7 illustrates an example embodiment of a tire having a tire tread 700. Tire tread 700 comprises a road-contacting surface 702, an inner component-contacting surface (not shown), at least one side surface 704, and a splice surface 706. Splice surface may comprise a radially outer edge 708 and a radially inner edge 710. In one embodiment, tire tread 700 comprises at least one conductive element 712. At least one conductive element 712 may substantially contact splice surface 706.

In one embodiment, at least one conductive element 712 extends across splice surface 706 and past radially inner edge 710. When tire tread 700 is completely contacted to an inner component 714, at least a portion of at least one conductive element 712 contacts at least a portion of inner component 714.

In another embodiment, at least one conductive element 712 extends across splice surface 706 and to or past radially outer edge 708. When tire tread 700 is completely contacted to inner component 714, at least a portion of at least one conductive element 712 extends to or past road-contacting surface 702.

In one embodiment, at least one conductive element extends from inner component 714 to or past road-contacting surface 702. During operation of the tire, built up electricity may travel from inner component 714, through or along at least one conductive element 712, and to a road, ground, or other grounded surface. Formation of this circuit allows built up electricity to be discharged into a road, the ground, or other grounded surface.

When a tire is placed into a mold and cured, a pattern may be imparted to tire tread 700 and road-contacting surface 702. The pattern may include at least one tread rib or tread block, and at least one groove. At least one conductive element 712 may be aligned, widthwise, with at least one tread rib or tread block, such that at least one conductive element 712 extends to the radially outermost portion of the at least one tread rib or tread block of the cured tire. In such a manner, it can be assured that at least one conductive element 712 extends all the way to the road, ground, or other grounded surface during operation of the cured tire.

Figure 8:
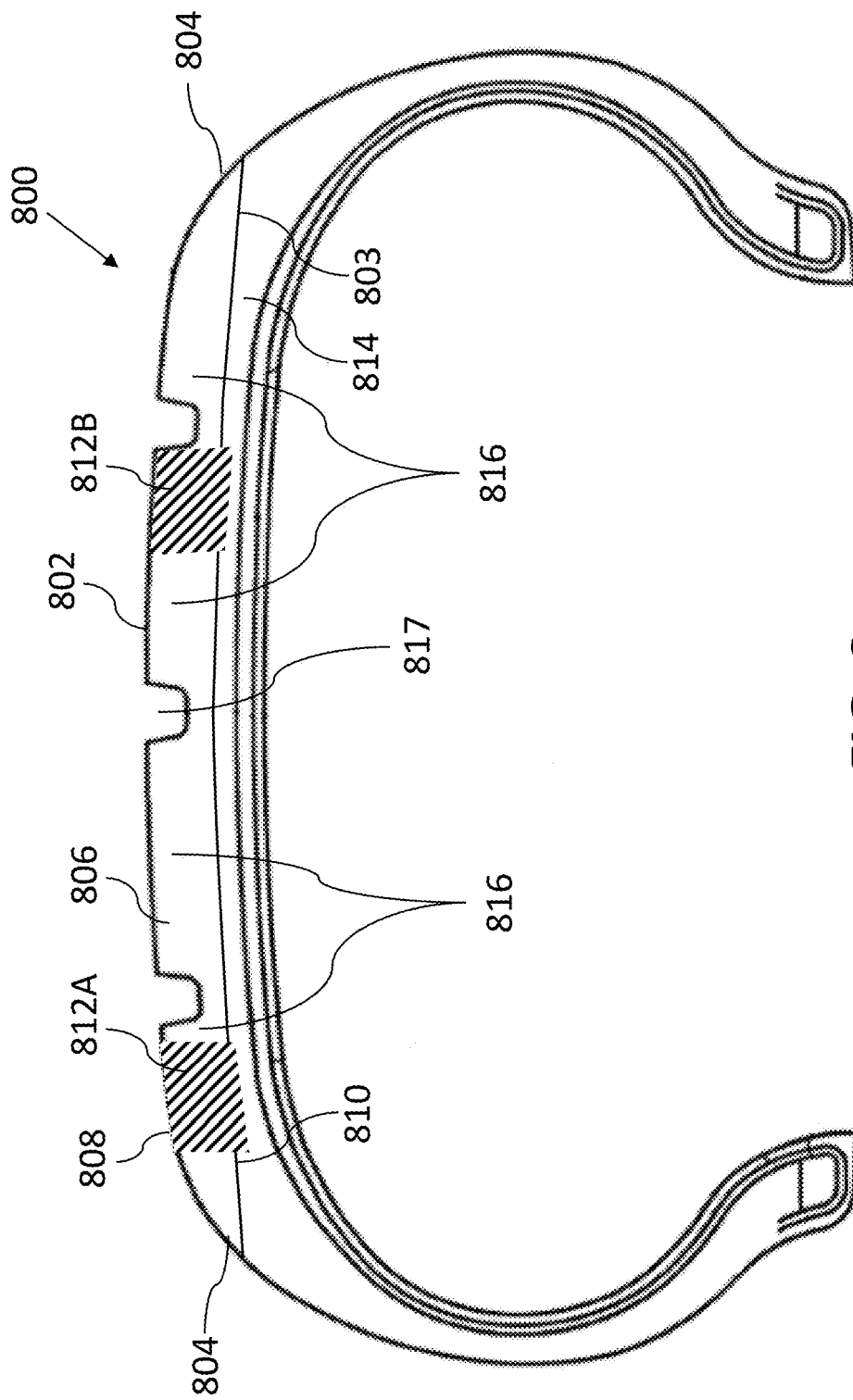
FIG. 8 illustrates a cross-sectional view of an example embodiment of a tire tread having a conductive element.

FIG. 8 illustrates an example embodiment of a tire tread 800. Tire tread 800 comprises a road-contacting surface 802, an inner component-contacting surface 803, at least one side surface 804, and a splice surface 806. Splice surface 806 may comprise a radially outer edge 808 and a radially inner edge 810. In one embodiment, tire tread 800 comprises at least one conductive element 812A and 812B.

As illustrated in FIG. 8, tire tread 800 may comprise a plurality of conductive elements 812. In one embodiment, tire tread 800 comprises a single conductive element.

In one embodiment, at least a portion of inner component-contacting surface 803 contacts inner component 814.

In one embodiment, tire tread 800 comprises at least one tread rib and/or tread block 816, and at least one groove 817. In one embodiment, at least one conductive element, such as conductive element 812A and 812B is axially aligned with at least one tread rib and/or tread block 816. In such a manner, at least one conductive element 812A and 812B connects road-contacting surface 802 with inner component 814.

Figure 9:
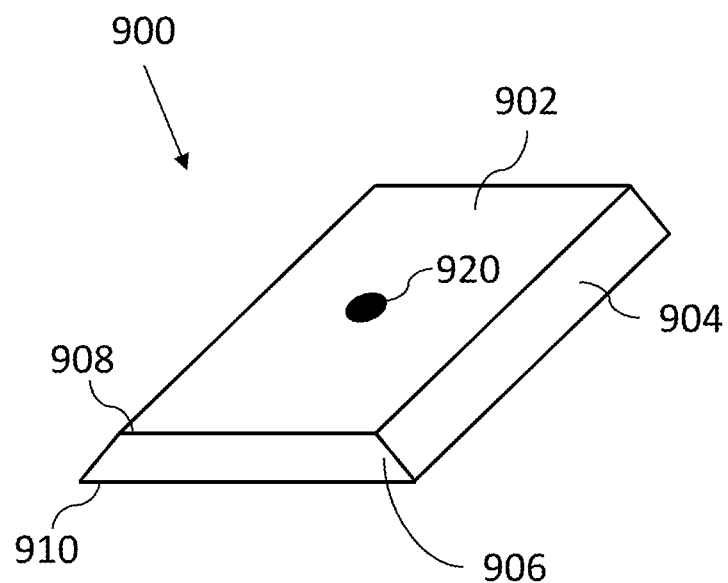
FIG. 9 illustrates a perspective view of an example embodiment of a tire tread having a conductive element.

FIG. 9 illustrates an example embodiment of a tire tread 900. Tire tread 900 comprises a road-contacting surface 902, an inner component-contacting surface (not shown), at least one side surface 904, and a splice surface 906. Splice surface may comprise a radially outer edge 908 and a radially inner edge 910. In one embodiment, tire tread 900 comprises at least one conductive element 920.

At least one conductive element 920 may extend from road-contacting surface 902, through the thickness of tire tread 900, and to an inner component-contacting surface (not shown). In one embodiment, at least one conductive element 920 extends through tire tread 900 at a point away from splice surface 906. In another embodiment, at least one conductive element 920 extends along and in contact with splice surface 906.

At least one conductive element 920 may be any of a variety of elongated shapes, including for example a cylinder, a strip, a pyramid, a cone, a cuboid, or any geometric shape.

In one embodiment, a single conductive element 920 extends through tire tread 900, such that only a single conductive element is included in a cured tire.

Figure 10:
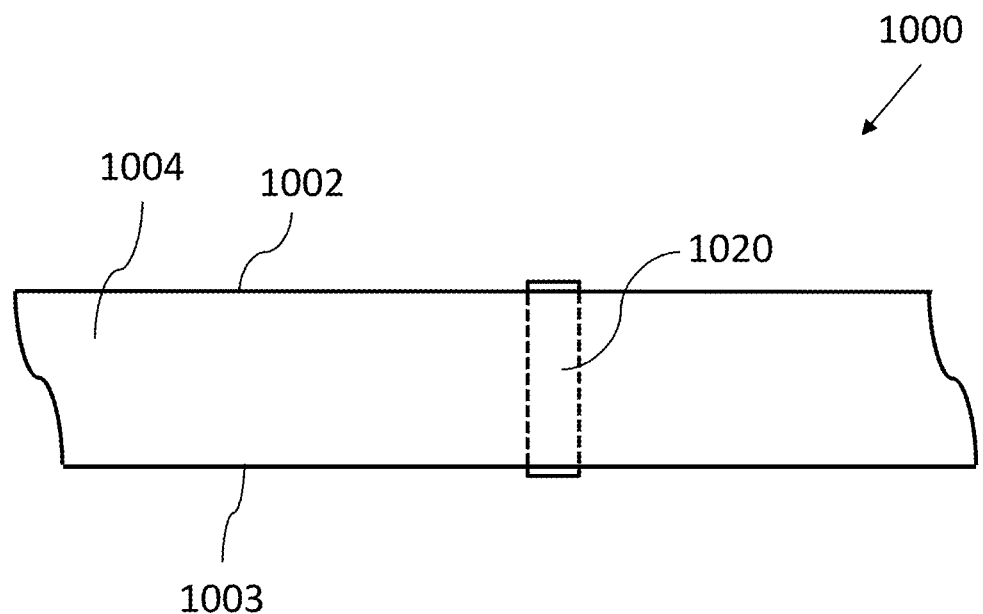
FIG. 10 illustrates a side exploded view of an example embodiment of a tire tread having a conductive element.

FIG. 10 illustrates an example embodiment of a tire tread 1000. Tire tread 1000 comprises a road-contacting surface 1002, an inner component-contacting surface 1003, and at least one side surface 1004. In one embodiment, tire tread 1000 comprises at least one conductive element 1020. In another embodiment, tire tread 1000 comprises a single conductive element 1020.

Figure 11A:
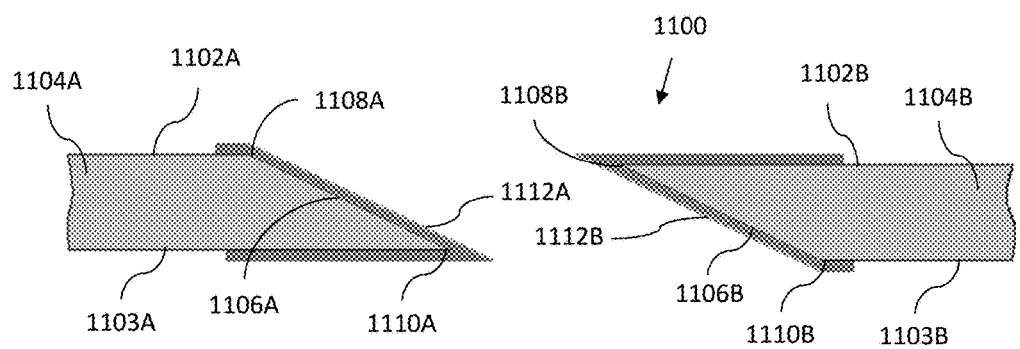
FIG. 11A illustrates a side view of an example embodiment of a tire tread splice having a conductive element.

FIG. 11A illustrates an example embodiment of a tire tread 1100 including a splice. Tire tread 1100 comprises a first road-contacting surface 1102A, a second road-contacting surface 1102B, a first inner component-contacting surface 1103A, a second inner component-contacting surface 1103B, a first side surface 1104A, a second side surface 1104B, a first splice surface 1106A, a second splice surface 1106B, a first radially outer edge 1108A, a second radially outer edge 1108B, a first radially inner edge 1110A, and a second radially inner edge 1110B. Tire tread 1100 may comprise at least one conductive element 1112A, 1112B oriented between first splice surface 1106A and second splice surface 1106B.

In one embodiment, tire tread 1100 comprises a plurality of conductive elements, such as 1112A and 1112B. In one embodiment, at least one conductive element 1112A, 1112B extends above first radially outer edge 1108A and second radially outer edge 1108B. In another embodiment, at least one conductive element 1112A, 1112B extends below first radially inner edge 1110A and second radially inner edge 1110B. In another embodiment, at least one conductive element 1112A, 1112B extends along at least a portion of first road-contacting surface 1102A and second road-contacting surface 1102B, respectively. In another embodiment, at least one conductive element 1112A, 1112B extends along at least a portion of first inner component-contacting surface 1103A and second inner component-contacting surface 1103B, respectively. In another embodiment, at least one conductive element 1112A, 1112B extends to first radially outer edge 1108A and second radially outer edge 1108B. In another embodiment, at least one conductive element 1112A, 1112B extends to first radially inner edge 1110A and second radially inner edge 1110B.

In one embodiment, at least a portion of at least one conductive element 1112A, 1112B extends from along at least one of first road-contacting surface 1102A and second road-contacting surface 1102B to along at least one of first inner component-contacting surface 1103A and second inner component-contacting surface 1103B.

In one embodiment, tire tread 1100 is cut to length prior to application to a tire carcass. At least one conductive element 1112A, 1112B may be wrapped around at least one edge of tire tread 1100 that has been cut to length. For example, at least one conductive element 1112A, 1112B may extend along at least one of first road-contacting surface 1102A and second road-contacting surface 1102B, along at least one of first splice surface 1106A and second splice surface 1106B, and along at least one of first inner component-contacting surface 1103A and second inner component-contacting surface 1103B. In one embodiment, at least one conductive element 1112A, 1112B is oriented substantially parallel to at least one of first splice surface 1106A and second splice surface 1106B.

Figure 11B:
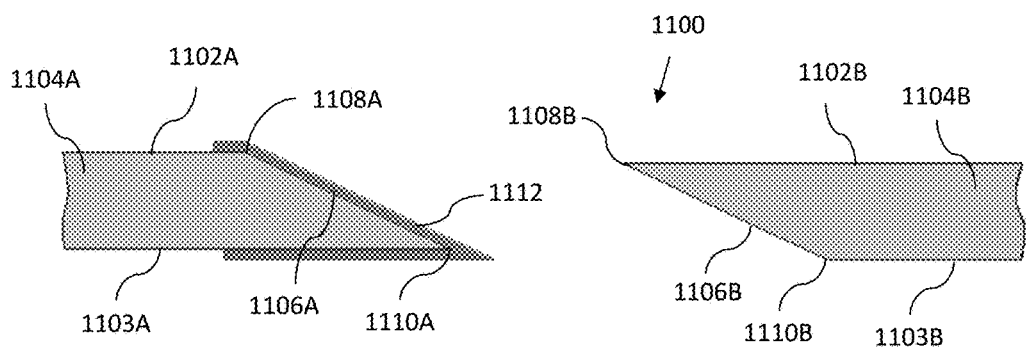
FIG. 11B illustrates a side view of an example embodiment of a tire tread splice having a conductive element.
Figure 11C:
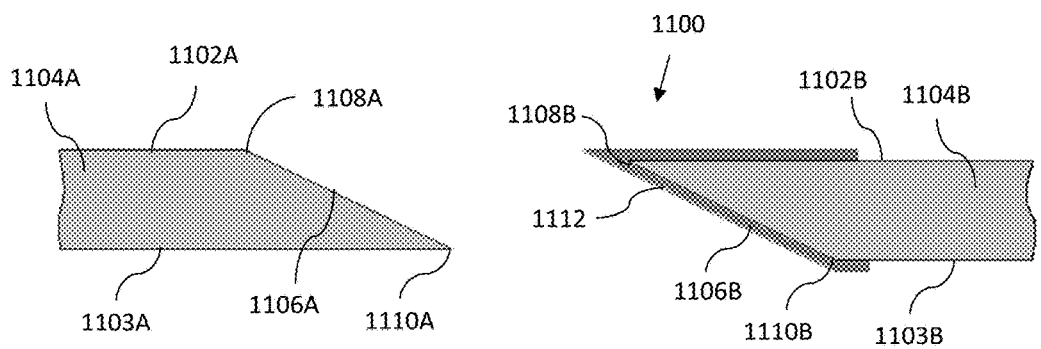
FIG. 11C illustrates a side view of an example embodiment of a tire tread splice having a conductive element.

FIG. 11B and FIG. 11C illustrate example embodiments of a tire tread 1100 including a splice. Tire tread 1100 comprises a first road-contacting surface 1102A, a second road-contacting surface 1102B, a first inner component-contacting surface 1103A, a second inner component-contacting surface 1103B, a first side surface 1104A, a second side surface 1104B, a first splice surface 1106A, a second splice surface 1106B, a first radially outer edge 1108A, a second radially outer edge 1108B, a first radially inner edge 1110A, and a second radially inner edge 1110B. Tire tread 1100 may comprise at least one conductive element 1112 oriented between first splice surface 1106A and second splice surface 1106B.

As illustrated in FIGS. 11B and 11C, at least one conductive element 1112 may be oriented on one of first splice surface 1106A and second splice surface 1106B, respectively. In one embodiment, tire tread 1100 is cut to length prior to application to a tire carcass. At least one conductive element 1112 may be wrapped around at least one edge of tire tread 1100 that has been cut to length. For example, at least one conductive element 1112 may extend along at least one of first road-contacting surface 1102A and second road-contacting surface 1102B, along at least one of first splice surface 1106A and 1106B, and along at least one of first inner component-contacting surface 1103A and second inner component-contacting surface 1103B. In practice, tire tread 1100 is oriented about a tire carcass and connected to itself, such that at least one conductive element 1112 is oriented between first splice surface 1106A and second splice surface 1106B. In one embodiment, at least one conductive element 1112 is oriented substantially parallel to at least one of first splice surface 1106A and second splice surface 1106B.

Figure 12:
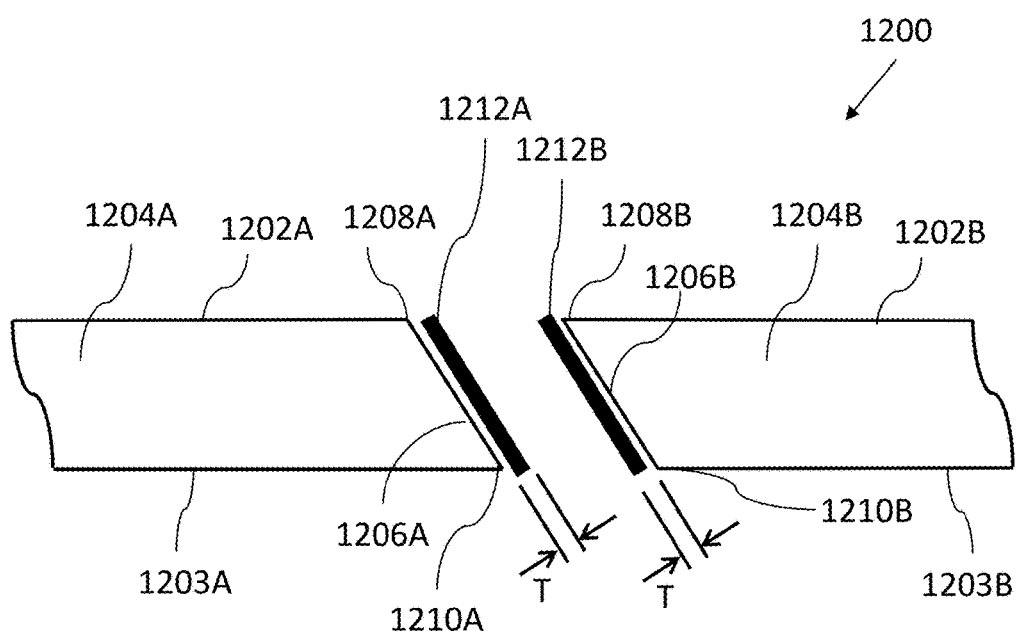
FIG. 12 illustrates a side exploded view of an example embodiment of a tire tread having a conductive element.

FIG. 12 illustrates an example embodiment of a tire tread 1200 including a splice. Tire tread 1200 comprises a first road-contacting surface 1202A, a second road-contacting surface 1202B, a first inner component-contacting surface 1203A, a second inner component-contacting surface 1203B, a first side surface 1204A, a second side surface 1204B, a first splice surface 1206A, a second splice surface 1206B, a first radially outer edge 1208A, a second radially outer edge 1208B, a first radially inner edge 1210A, and a second radially inner edge 1210B. Tire tread 1200 may comprise at least one conductive element 1212A, 1212B oriented between first splice surface 1206A and second splice surface 1206B.

In one embodiment, at least one conductive element 1212A, 1212B extends above first radially outer edge 1208A and second radially outer edge 1208B. In another embodiment, at least one conductive element 1212A, 1212B extends below first radially inner edge 1210A and second radially inner edge 1210B. In another embodiment, at least one conductive element 1212A, 1212B extends to first radially outer edge 1208A and second radially outer edge 1208B. In another embodiment, at least one conductive element 1212A, 1212B extends to first radially inner edge 1210A and second radially inner edge 1210B.

In one embodiment, tire tread 1200 comprises a first conductive element 1212A and a second conductive element 1212B. In another embodiment, tire tread 1200 comprises a single conductive element, including for example one of conductive element 1212A, 1212B. In one embodiment, first conductive element 1212A is applied to first splice surface 1206A. In another embodiment, second conductive element 1212B is applied to second splice surface 1206B. In another embodiment, first conductive element 1212A is applied to first splice surface 1206A and second conductive element 1212B is applied to second splice surface 1206B.

In one embodiment, at least one conductive element 1212A, 1212B comprises a width substantially equal to the width of tire tread 1200. In another embodiment, at least one conductive element 1212A, 1212B comprises a width less than the width of tire tread 1200. In another embodiment, at least one conductive element 1212A, 1212B comprises a width greater than the width of tire tread 1200.

In one embodiment, at least one conductive element 1212A, 1212B comprises a thickness T of about 0.015 mm or greater. In another embodiment, at least one conductive element 1212A, 1212B comprises a thickness T of about 0.100 mm or greater. In another embodiment, at least one conductive element 1212A, 1212B comprises a thickness T of about 0.500 mm or greater. In another embodiment, at least one conductive element 1212A, 1212B comprises a thickness T of between about 0.015 mm and about 6.000 mm. In another embodiment, at least one conductive element 1212A, 1212B comprises a thickness T of between about 0.050 mm and about 4.000 mm. In another embodiment, at least one conductive element 1212A, 1212B comprises a thickness T of between about 0.100 mm and about 2.000 mm. In another embodiment, at least one conductive element 1212A, 1212B comprises a thickness T of between about 0.200 mm and about 1.500 mm. In another embodiment, at least one conductive element 1212A, 1212B comprises a thickness T less than about 6.000 mm. In another embodiment, at least one conductive element 1212A, 1212B comprises a thickness T less than the entire circumference of a tire. Thickness T of at least one conductive element 1212A, 1212B is defined as its dimension in a circumferential direction of a tire.

In one embodiment, first splice surface 1206A and second splice surface 1206B may be oriented on an angle. In another embodiment, first splice surface 1206A and second splice surface 1206B may be oriented substantially orthogonally. In another embodiment, first splice surface 1206A and second splice surface 1206B may comprise substantially linear profiles. In another embodiment, first splice surface 1206A and second splice surface 1206B may comprise curved or otherwise irregular profiles.

Figure 13A:
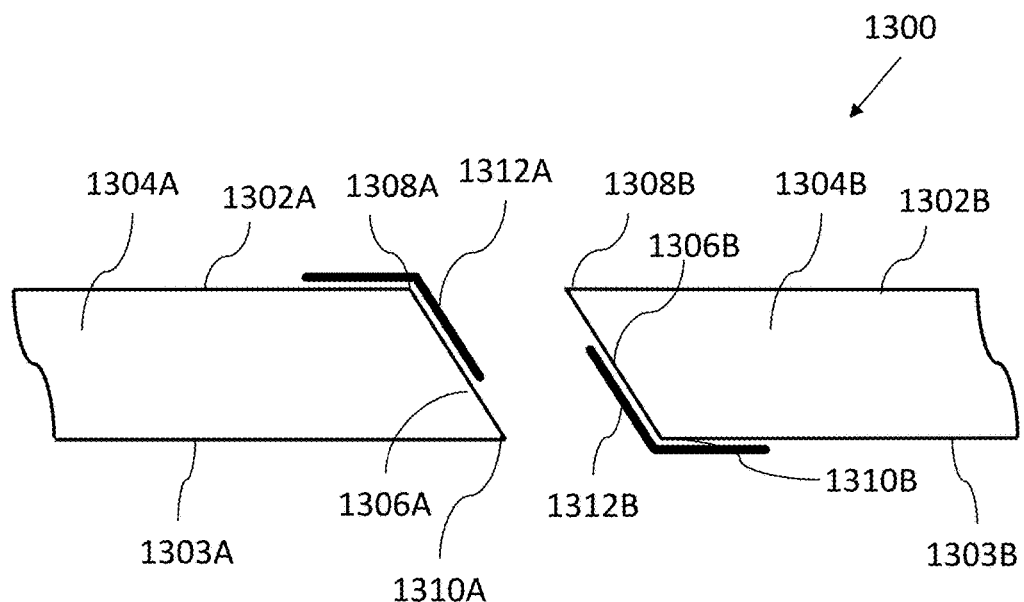
FIG. 13A illustrates a side exploded view of an example embodiment of a tire tread having a conductive element.
Figure 13B:
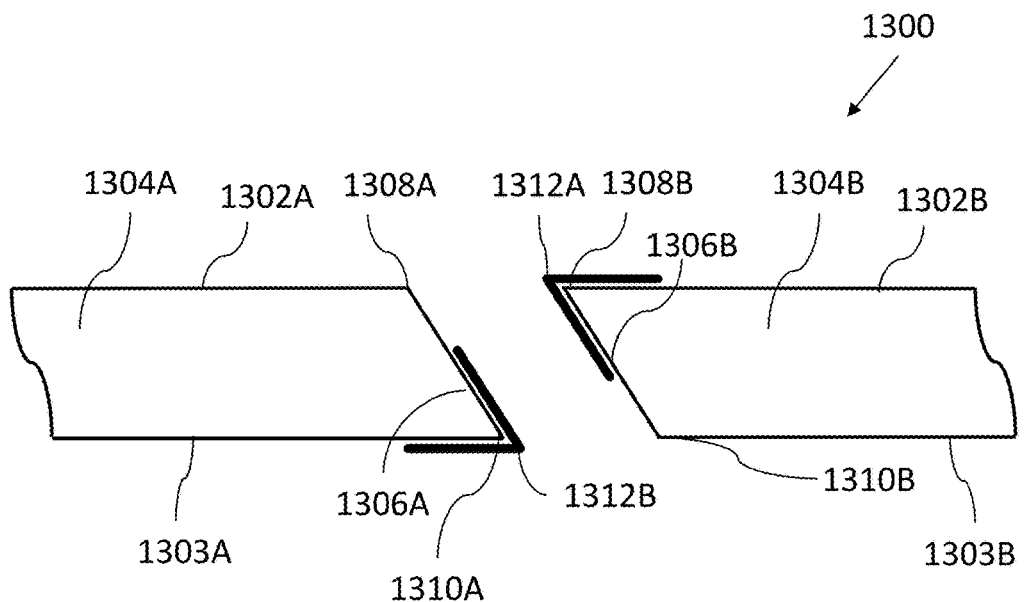
FIG. 13B illustrates a side exploded view of an example embodiment of a tire tread having a conductive element.

FIGS. 13A and 13B illustrate an example embodiment of a tire tread 1300 including a splice. Tire tread 1300 comprises a first road-contacting surface 1302A, a second road-contacting surface 1302B, a first inner component-contacting surface 1303A, a second inner component-contacting surface 1303B, a first side surface 1304A, a second side surface 1304B, a first splice surface 1306A, a second splice surface 1306B, a first radially outer edge 1308A, a second radially outer edge 1308B, a first radially inner edge 1310A, and a second radially inner edge 1310B. Tire tread 1300 may comprise at least one conductive element 1312A, 1312B oriented between first splice surface 1306A and second splice surface 1306B.

At least one conductive element 1312A may extend above first radially outer edge 1308A and second radially outer edge 1308B. At least one conductive element 1312B may extend below first radially inner edge 1310A and second radially inner edge 1310B. At least one conductive element 1312A may extend to first radially outer edge 1308A and second radially outer edge 1308B. At least one conductive element 1312B may extend to first radially inner edge 1310A and second radially inner edge 1310B.

At least one conductive element 1312A may extend along at least a portion of at least one of first road-contacting surface 1302A and second road-contacting surface 1302B. At least one conductive element 1312B may extend along at least a portion of at least one of first inner component-contacting surface 1303A and second inner component-contacting surface 1303B.

Tire tread 1300 may include a tread pattern as illustrated in FIG. 8, which may include at least one tread rib or tread block, and at least one groove. At least one conductive element 1312A, 1312B may be aligned, widthwise, with at least one tread rib or tread block, such that at least one conductive element 1312A, 1312B extends to the radially outermost portion of the at least one tread rib or tread block of the cured tire. In such a manner, it can be assured that at least one conductive element 1312A, 1312B extends all the way to the road, ground, or other grounded surface during operation of the cured tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to indicate a nature of an element and/or a relationship between elements within a reasonable degree of precision and tolerance as is acceptable in the relevant field of technology. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire tread, comprising:
a road-contacting surface;
an inner component-contacting surface;
a splice surface comprising a radially outer edge and a radially inner edge;
at least one conductive element;
wherein the at least one conductive element extends from the splice surface to or past the radially outer edge;
wherein the at least one conductive element extends from the splice surface to or past the radially inner edge;
wherein each of the at least one conductive element is oriented in contact with the splice surface;
wherein each of the at least one conductive element is oriented substantially parallel to the splice surface;
wherein the at least one conductive element comprises a circumferential thickness of between about 0.015 mm and about 6.000 mm;
wherein the at least one conductive element extends along at least a portion of at least one of the road-contacting surface and the inner component-contacting surface; and
wherein the at least one conductive element covers an entire surface of the splice surface.

2. The tire tread of claim 1, wherein the at least one conductive element extends from the splice surface to the radially outer edge.

3. The tire tread of claim 1, wherein the at least one conductive element extends from the splice surface past the radially inner edge.

4. The tire tread of claim 1, further comprising:
a pattern comprising at least one of at least one tread rib or at least one tread block,
wherein at least one of the at least one tread rib and the at least one tread block comprises a radially outermost portion; and
wherein the at least one conductive element extends from the splice surface to the radially outermost portion.

5. The tire tread of claim 1, wherein the tire tread comprises a nonconductive material, and wherein the at least one conductive element comprises a carbon black.

6. A tire, comprising:
an inner component; and
a tire tread, comprising:
a road-contacting surface;
an inner component-contacting surface;
a splice surface comprising a radially outer edge and a radially inner edge;
at least one conductive element
wherein the at least one conductive element extends from the splice surface to or past the radially outer edge;
wherein the at least one conductive element extends from the splice surface to or past the radially inner edge and contacts the inner component;
wherein each of the at least one conductive element is oriented in contact with the splice surface;
wherein each of the at least one conductive element is oriented substantially parallel to the splice surface;
wherein the at least one conductive element extends along at least a portion of at least one of the road-contacting surface and the inner component-contacting surface; and
wherein the at least one conductive element covers an entire surface of the splice surface.

7. The tire of claim 6, wherein the at least one conductive element comprises a thickness of about 0.015 mm or greater.

8. The tire of claim 6, wherein the at least one conductive element extends from the splice surface to the radially outer edge.

9. The tire of claim 6, wherein the at least one conductive element extends from the splice surface past the radially inner edge and contacts the inner component.

10. The tire of claim 6, wherein the tire tread further comprises:
    a pattern comprising at least one of at least one tread rib or at least one tread block,
        wherein at least one of the at least one tread rib and the at least one tread block comprises a radially outermost portion; and
        wherein the at least one conductive element extends from the splice surface to the radially outermost portion.

11. The tire of claim 6, wherein the tire tread comprises a nonconductive material, and wherein the at least one conductive element comprises a carbon black.

12. A tire tread, comprising:
    a road-contacting surface;
    an inner component-contacting surface;
    a splice surface comprising a radially outer edge and a radially inner edge;
    at least two conductive elements;
    wherein one of the conductive elements extends from the splice surface to or past the radially outer edge;
    wherein one of the conductive elements extends from the splice surface to or past the radially inner edge;
    wherein each of the conductive elements is oriented in contact with the splice surface;
    wherein each of the conductive elements is oriented substantially parallel to the splice surface;
    wherein each of the conductive elements comprises a circumferential thickness of between about 0.015 mm and about 6.000 mm; and
    wherein one of the conductive elements extends along at least a portion of the road-contacting surface, and wherein one of the conductive elements extends along at least a portion of the inner component-contacting surface.

13. The tire tread of claim 12, further comprising:
    a pattern comprising at least one of at least one tread rib or at least one tread block,
        wherein at least one of the at least one tread rib and the at least one tread block comprises a radially outermost portion; and
        wherein one of the conductive elements extends from the splice surface to the radially outermost portion.

* * * * *